US008363676B2

(12) United States Patent
Yang et al.

(10) Patent No.: US 8,363,676 B2
(45) Date of Patent: Jan. 29, 2013

(54) METHODS AND APPARATUSES FOR ADDING/DETECTING AN ADAPTIVE AND EXTENDABLE SEQUENCE INDEX

(75) Inventors: Tao Yang, Shanghai (CN); Feng Wang, Shanghai (CN)

(73) Assignee: Alcatel Lucent, Paris (FR)

( * ) Notice: Subject to any disclaimer, the term of this patent is extended or adjusted under 35 U.S.C. 154(b) by 417 days.

(21) Appl. No.: 12/672,566

(22) PCT Filed: Jun. 17, 2008

(86) PCT No.: PCT/CN2008/001177
§ 371 (c)(1),
(2), (4) Date: Feb. 8, 2010

(87) PCT Pub. No.: WO2009/021393
PCT Pub. Date: Feb. 19, 2009

(65) Prior Publication Data
US 2011/0261836 A1 Oct. 27, 2011

(30) Foreign Application Priority Data
Aug. 10, 2007 (CN) .......................... 2007 1 0044819

(51) Int. Cl.
*H04L 12/00* (2006.01)
(52) U.S. Cl. ......... 370/474; 370/236; 370/278; 370/464
(58) Field of Classification Search .......... 370/389–394, 370/432, 466–476, 236, 278; 714/701, 776, 714/798
See application file for complete search history.

(56) References Cited

U.S. PATENT DOCUMENTS

| 5,121,396 | A  | * | 6/1992  | Irvin et al. ..................... 714/807 |
| 6,956,870 | B1 | * | 10/2005 | Charriere et al. ............. 370/470 |
| 7,298,745 | B2 | * | 11/2007 | Egevang ....................... 370/394 |
| 7,675,941 | B2 | * | 3/2010  | Kim et al. ..................... 370/473 |
| 8,102,880 | B2 | * | 1/2012  | Charpentier et al. ......... 370/474 |
| 2005/0213605 | A1 | * | 9/2005  | Kim et al. ..................... 370/466 |
| 2005/0271056 | A1 | * | 12/2005 | Kaneko ......................... 370/389 |
| 2007/0091810 | A1 | * | 4/2007  | Kim et al. ..................... 370/236 |
| 2010/0002727 | A1 | * | 1/2010  | Svelmoe ....................... 370/474 |

FOREIGN PATENT DOCUMENTS

| CN | 1221548 A | 6/1999 |
| CN | 1619999 A | 5/2005 |
| CN | 1700674 A | 11/2005 |
| CN | 1929437 A | 3/2007 |

OTHER PUBLICATIONS

International Search Report.

* cited by examiner

*Primary Examiner* — Habte Mered
*Assistant Examiner* — Vincelas Louis
(74) *Attorney, Agent, or Firm* — Fay Sharpe LLP

(57) ABSTRACT

According to the present invention, there is proposed a method of adding/detecting an adaptive and extendable segment index for re-segmentation and an apparatus thereof. According to the present invention, the method of adding a segment index comprising steps of determining whether a re-segmentation happens; looking for in a re-segmentation header of a current block a bit indicating the end of the re-segmentation header and the start of other information if it is determined a re-segmentation happens; and inserting two bits immediately before the bit indicating the end of the re-segmentation header and the start of other information, a first bit indicating a higher level re-segmentation has happened, and a second bit indicating one part generated in this re-segmentation.

30 Claims, 6 Drawing Sheets

- Li (1bit): the Ith level re-segmentation. Li=0 indicates the start of the other header.
- L/Ri (1bit): the left/right part of the ith level re-segmentation.

METHODS AND APPARATUSES FOR ADDING/DETECTING AN ADAPTIVE AND EXTENDABLE SEQUENCE INDEX

FIELD OF THE INVENTION

The present invention relates to mobile communication systems and, more particularly, to methods and apparatuses for adding/detecting an adaptive and extendable sequence index for a Radio Link Controller-Protocol Data Unit (RLC-PDU) re-segmentation.

BACKGROUND OF THE INVENTION

At the current stage, the Third Generation Partnership Project (3GPP) is discussing the RLC PDU re-segmentation related topics. Among others, one key issue is how to indicate the position of each segment in its original RLC PDU, so as to guarantee the receiver can order each segment correctly and assemble them into the original RLC PDU.

3GPP has determined that RLC PDU re-segmentation must support the following requirements:

The number of re-segmentation is unlimited;
The RLC PDU segment can be re-segmented; and
The RLC PDU header overhead for re-segmentation indication should be as low as possible.

Some companies have commented that the number of re-segmentation will not be very high in real situation, for example, 2 or 3 maybe the major case. However, we cannot exclude the higher-numbered re-segmentation scenario, which maybe rare cases.

Two solutions on how to indicate each RLC PDU segments have been proposed in the prior art:

Solution 1: Offset;
Solution 2: Segment index which only supports a limited number of re-segmentation.
These two solutions are described respectively below.
Solution 1: Offset In the solution, a 16-bit field "Offset" is added in each RLC-PDU segment to indicate its first byte's position in the original RLC PDU. The 16-bit field is determined according to a peak rate of 100 Mbit in LTE (Long Term Evolution) DL (downlink).

FIG. 1 is a schematic diagram for explaining the Offset solution.

As shown in FIG. 1, it is assumed that the original RLC PDU is segmented into 3 parts, including RLC PDU segments 1-3. The RLC PDU segment 2 is further segmented into RLC PDU segments 4 and 5 when it is re-transmitted. That means, the receiver finally receives RLC PDU segments 1, 3, 4, 5. In each segment, one field "Offset" with a 16-bit fixed size is used to indicate the start position of each segment in the original RLC PDU.

In RLC PDU segment 1, the Offset indicates its first byte's position is A in the original RLC PDU;
In RLC PDU segment 2, the Offset indicates its first byte's position is B in the original RLC PDU;
In RLC PDU segment 3, the Offset indicates its first byte's position is D in the original RLC PDU;
In RLC PDU segment 4, the Offset indicates its first byte's position is B in the original RLC PDU; and
In RLC PDU segment 5, the Offset indicates its first byte's position is C the original RLC PDU.

It is obvious that the receiver (Rx) can order each segment correctly in an order of segment 1, segment 4, segment 5 and segment 3, according to their "Offset" fields.

The bits of the Offset fields transmitted in the Uu interface are calculated as follows:

When the RLC PDU segment 1 is transmitted, a 16-bit Offset field is sent in the Uu interface;
When the RLC PDU segment 2 is transmitted, a 16-bit Offset field is sent in the Uu interface;
When the RLC PDU segment 3 is transmitted, a 16-bit Offset field is sent in the Uu interface;
When the RLC PDU segment 4 is transmitted, a 16-bit Offset field is sent in the Uu interface;
When the RLC PDU segment 5 is transmitted, a 16-bit Offset field is sent in the Uu interface.

Then totally 16*5=80 bits are transmitted when the Rx has received all the segments.

On one hand, the solution has the advantages as follows:
The unlimited re-segmentation is supported; and
The segment can be re-segmented.
On the other hand, the solution has the drawbacks as follows:
The 16-bit Offset field leads to a big RLC PDU header overhead; and
Some companies prefer to use the segment index solution.
Solution 2: Segment Index In this solution, a fix-sized Sub-segment Index (SegInd) is added in each segment to indicate its order in the original RLC PDU.

FIG. 2 is a schematic diagram for explaining the Segment Index solution.

As shown in FIG. 2, a 4-bit "SegInd" field is attached in each segment to show its order in the original RLC PDU. It is clear that the original RLC PDU can only be segmented into for example $2^{4=16}$ blocks.

For example, 0000, 0001 and 0002 are set for segments 1, 2, 3 respectively, as respective segment indexes. However, Re-segmentation of segment 2 into segments 4 and 5 can not be supported in this solution, because the segment index SegInx cannot be set correctly in such case.

On one hand, this solution has the advantages as follows:
Less bits used for the segment index SegInx compared to the 16-bit Offset field help to decrease the segment header overhead, especially when the support segment number is small, which maybe the major case in real situation.
On the other hand, this solution has the drawbacks as follows:
The un-limited re-segmentation can not be supported; and
The further re-segment of a segment can not be supported.

Therefore, one solution is needed which introduces small re-segmentation header overhead at low re-segmentation level, while is adaptive for supporting un-limited high re-segmentation level. Such solution is proposed according to the present invention to satisfy such requirement.

SUMMARY OF THE INVENTION

According to the embodiments of the present invention, there is proposed a method and apparatus of adding/detecting an adaptive and extendable segment index for RLC PDU re-segmentation, which introduces small re-segmentation header overhead at low re-segmentation level, while is adaptive for supporting an un-limited higher re-segmentation level.

According to the first aspect of the present invention, there is proposed a method of adding a segment index for re-segmentation, comprising steps of: determining whether a re-segmentation happens; looking for in a re-segmentation header of a current block a bit indicating the end of the re-segmentation header and the start of other information if it is determined a re-segmentation happens; and inserting two bits immediately before the bit indicating the end of the re-segmentation header and the start of other information, a first bit indicating a higher level re-segmentation has happened, and a second bit indicating one part generated in this re-segmentation.

According to the second aspect of the present invention, there is proposed an apparatus of adding a segment index for re-segmentation, comprising: an input unit for receiving an original block and a re-segmentation instruction from exterior; a determination unit for determining whether a re-segmentation happens according to the information transmitted from the input unit, and looking for in the re-segmentation header of the current block a bit indicating the end of the re-segmentation header and the start of other information if it is determined a re-segmentation happens; and an insertion unit for inserting two bits immediately before the bit indicating the end of the re-segmentation header and the start of other information, a first bit indicating a higher level re-segmentation happens, and a second bit indicating one part generated in this re-segmentation.

According to the third aspect of the present invention, there is proposed a method of detecting a segment index for re-segmentation, comprising the steps of: determining in a re-segmentation header of a current block a bit indicating the end of the re-segmentation header and the start of other information; and storing the re-segmentation header from the first bit of the re-segmentation header to the determined bit indicating the end of the re-segmentation header and the start of other information.

According to the fourth aspect of the present invention, there is proposed an apparatus of detecting a segment index for re-segmentation, comprising: an input unit for receiving an original block; a determination unit for determining in a re-segmentation header of the current block a bit indicating the end of the re-segmentation header and the start of other information, according to information transmitted from the input unit; and a storing unit for storing the re-segmentation header from the first bit of the re-segmentation header to the determined bit indicating the end of the re-segmentation header and the start of other information.

According to the present invention, the transmitter may be the base station or the mobile station, and correspondingly the receiver may be the mobile station or the base station. The apparatus of adding a segment index for re-segmentation according to the present invention and the apparatus of detecting a segment index for re-segmentation according to the present invention can be included in the base station or the mobile station.

BRIEF DESCRIPTION OF THE DRAWINGS

The above and other objects, features and advantages of the present invention will be clearer from the following detailed description about the preferred embodiments of the present invention taken in conjunction with the accompanied drawings, in which.

DETAILED DESCRIPTION OF THE PREFERRED EMBODIMENTS

The preferred embodiments of the present invention will be detailed in the following with reference to the drawings. While it may blur the understanding of the present invention, the conventional structure or construction will be omitted.

An adaptive and extendable segment index solution is proposed according to the present invention. The basic idea is as follows.

1 bit=0 (EndBit=0) is used to indicate the end of a re-segmentation header and the start of other information. In a original RLC PDU, this bit (EndBit=0) is also used to indicate no re-segmentation happens;

Such case can be considered as that an RI (Re-segmentation Indicator) is set as 0 and always placed at the end of the re-segmentation header, or as that the bit EndBit (=0) indicating the end of the re-segmentation header and the start of other information is RI, and is set as 0 in case that no re-segmentation happens. In case that a re-segmentation happens, the first bit of the re-segmentation header is RI and set as 1, and a bit indicating the end of the re-segmentation header and the start of other information is added at the end of the re-segmentation header, and set as 0 (EndBit=0).

In each re-segmentation, the original block is segmented into two parts, the first part being transmitted in current Transmission Time Interval (TTI) while the remaining part being buffered for a next transmission chance. Taking this fact into account, two bits are added before the bit EndBit at each time of re-segmentation as follows:

1 bit ($L_i$, i being a natural number)=1 is added to indicate a higher level re-segmentation happens;

1 bit ($L/R_i$, i being a natural number) is used to differentiate the two parts generated in this re-segmentation;

The bit EndBit=0 is unchanged and indicates the end of re-segmentation header and the start of other information.

The effect brought out by such addition includes:

The header overhead for different re-segmentation level is different:

re-segmentation header overhead is small in low level re-segmentation scenario which is the major case in real situation.

The header overhead is adaptive and extendable:

The un-limited re-segmentation is supported; and

The further re-segmentation of a RLC PDU segment is supported.

In the above example, it is set that EndBit=0 and Li=1 in case a re-segmentation happens and it is only set EndBit=0 in case no re-segmentation happens. However, the present invention is not limited to such example. As another example, it is set that EndBit=1 and Li=0 in case a re-segmentation happens and only EndBit=1 in case no re-segmentation happens.

An example where it is set that EndBit=0 and Li=1 in case a re-segmentation happens and only EndBit 0 in case no re-segmentation happens is described in detail below.

Figure 3:
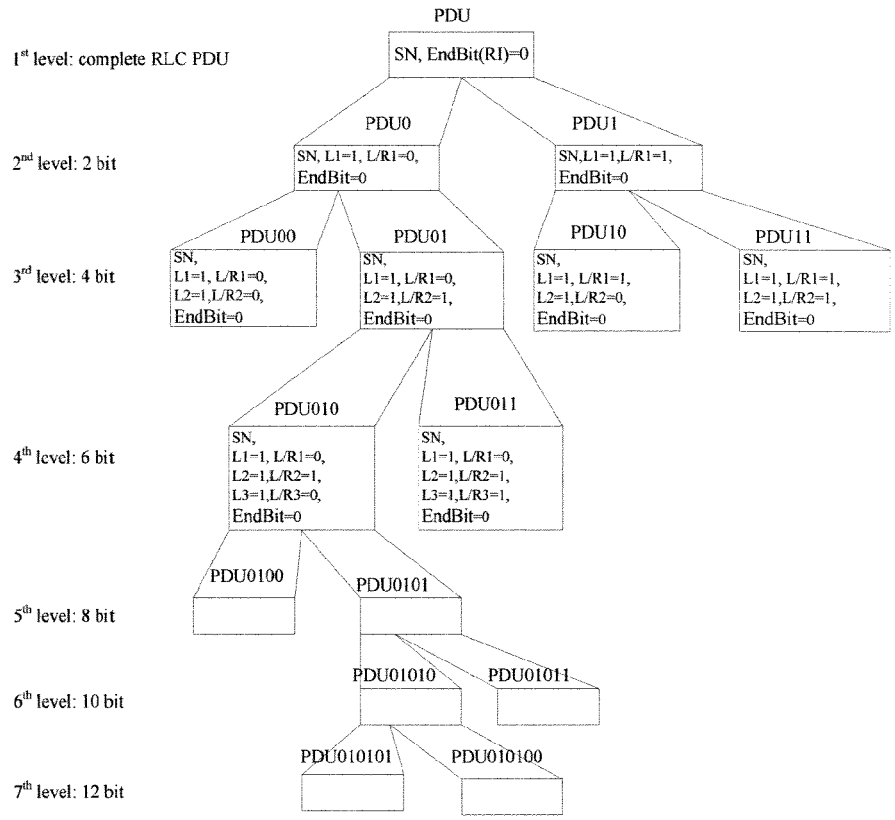
FIG. 3 is a schematic diagram of a segment index for re-segmentation according to the present invention.

FIG. 3 is a schematic diagram of a segment index for re-segmentation according to the present invention.

The re-segmentation header according to the present invention is described in conjunction with FIG. 3.

For the first level which is the original RLC PDU, one bit Endbit=0 is set in the RLC PDU header. When it is detected that EndBit=0, the receiver knows that this is an original RLC PDU and no re-segmentation header exists.

For the second level where the original RLC PDU is segmented into two parts:

The original RLC PDU is segmented into two parts, RLC PDU0 and RLC PDU1; RLC PDU0 is transmitted in this TTI while RLCPDU1 is buffered for the next transmission chance;

Two bits are added to the RLC PDU0 and RLC PDU1 before the bit EndBit=0:

1 bit L1=1 is added to indicate a higher level re-segmentation happens and the following 1 bit is the L/R bit;

1 bit L/R is added to differentiate the two parts generated in this re-segmentation. For example, 1 indicates the left part and 0 the right part.

The bit EndBit=0 is unchanged and indicates the end of the re-segmentation header and the start of other information.

For the third level, two bits are added before the bit End-Bit=0 as:

1 bit L2=1 is added to indicate that a higher level re=segmentation happens, which is followed by a bit L/R;

1 bit L/R2 is added. For example, L/R2=0 indicates that this part is a left part, while L/R2=1 indicates that this part is a right part, and vice versa.

The bit EndBit=0 is unchanged.

The procedure is the same for the sequential $i^{th}$ level (i is a natural number).

As can be seen from the comparison, the proposed solution is different from the Offset solution which needs 16 bits regardless of the re-segmentation level in that:

For the first level re-segmentation (i.e., the original RLC PDU), no more bit is needed;

For the second level re-segmentation, the proposed solution only needs 2 bits to be added;

For the third level re-segmentation, the proposed solution needs 4 bits to be added;

For the fourth level re-segmentation, the proposed solution needs 6 bits to be added;

For the fifth level re-segmentation, the proposed solution needs 8 bits to be added;

. . . ;

For the eighth level re-segmentation, the proposed solution needs 14 bits to be added;

For the ninth level re-segmentation, the proposed solution needs 16 bits to be added.

This comparison is shown table 1 below.

TABLE 1 comparison of re-segmentation header overhead between the proposed solution and the Offset solution

| Re-segmentation Level | The Proposed Solution | The Offset Solution |
| --- | --- | --- |
| 1 | 0 | 0 |
| 2 | 2 | 16 |
| 3 | 4 | 16 |
| 4 | 6 | 16 |
| 5 | 8 | 16 |
| . . . | . . . | . . . |
| 9 | 16 | 16 |

As shown in Table 1, for the second to eighth level re-segmentations, the proposed solution leads to a less header overhead compared with the offset solution.

As many companies have commented, 2 or 3 re-segmentation levels maybe the major case in real situation. That means, in the major case, the proposed solution has the benefits of a less header overhead compared with the Offset solution.

Figure 1:
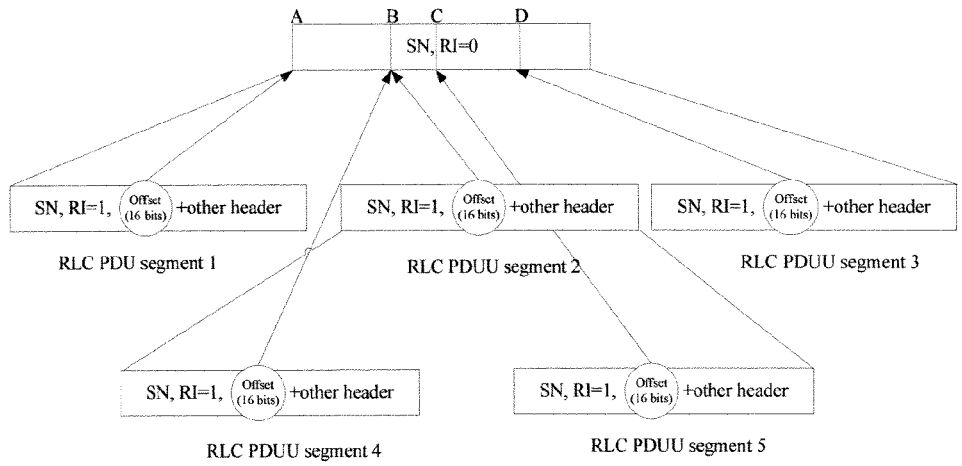
FIG. 1 is a schematic diagram for explaining the Offset solution for re-segmentation.
Figure 2:
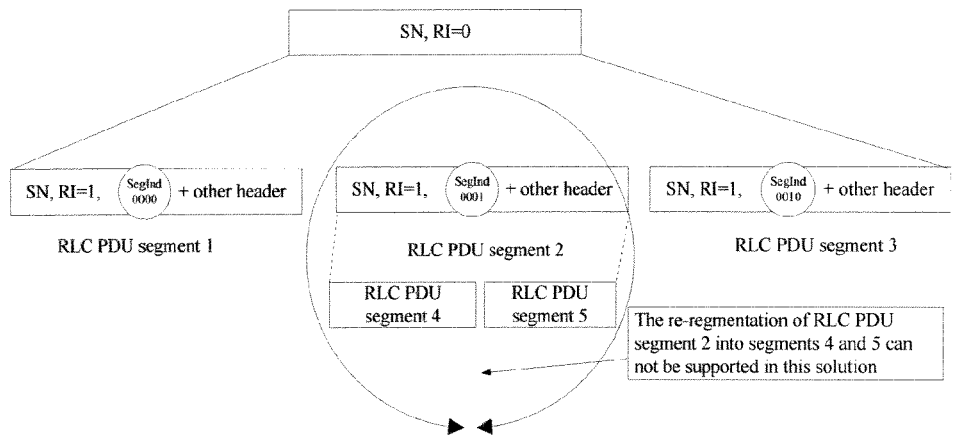
FIG. 2 is a schematic diagram for explaining the Segment Index solution for re-segmentation.

Consider the same example shown in FIG. 1 below. Assume that each segment is transmitted in successive TTIs:

The original RLC PDU is re-segmented into two parts in the first TTI (TTI 1), and the first part RLC PDU segment 1 is transmitted in the first TTI.

In the second TTI (TTI 2) the left part is further re-segmented into two parts before it is transmitted. The PLC PDU segment 2 is transmitted in the second TTI but fails.

In the third TTI, the left part is transmitted in this TTI as RLC PDU segment 3 with success.

In the fourth TTI, the RLC PDU segment 2 is further re-segmented into two parts, RLC PDU segment 4 and RLC PDU segment 5, before it is re-transmitted. The RLC PDU segment 4 is transmitted in this TTI with success.

In the fifth TTI, the left RLC PDU segment 5 is transmitted successfully.

Figure 4:
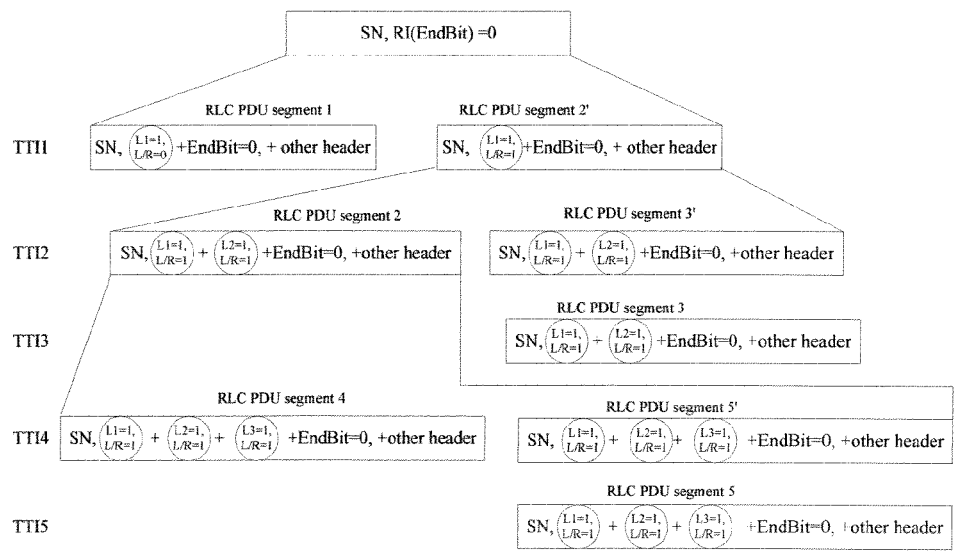
FIG. 4 is a schematic diagram of an embodiment where the present invention is applied in the example of FIG. 1.

The procedure is shown FIG. 4.

As shown in FIG. 4, the re-segmentation header overhead of the proposed solution is:

In TTI 1, 2 bits are transmitted in Uu interface;
In TTI 2, 4 bits are transmitted in Uu interface;
In TTI 3, 4 bits are transmitted in Uu interface;
In TTI 4, 6 bits are transmitted in Uu interface; and
In TTI 5, 6 bits are transmitted in Uu interface.

Totally, 32 bits are transmitted in the Uu interface until the 4 segments have been successfully transmitted, which is only 27.5% (=22/80*100%) of the overhead leaded by the Offset solution.

The Rx can easily order the four segments based on the re-segmentation header without any ambiguity.

Hereunder, the method and apparatus of adding/detecting an adaptive and extendable segment index for PLC PDU re-segmentation according to the present invention will be detailed in the following with reference to FIGS. 5-8.

Figure 5:
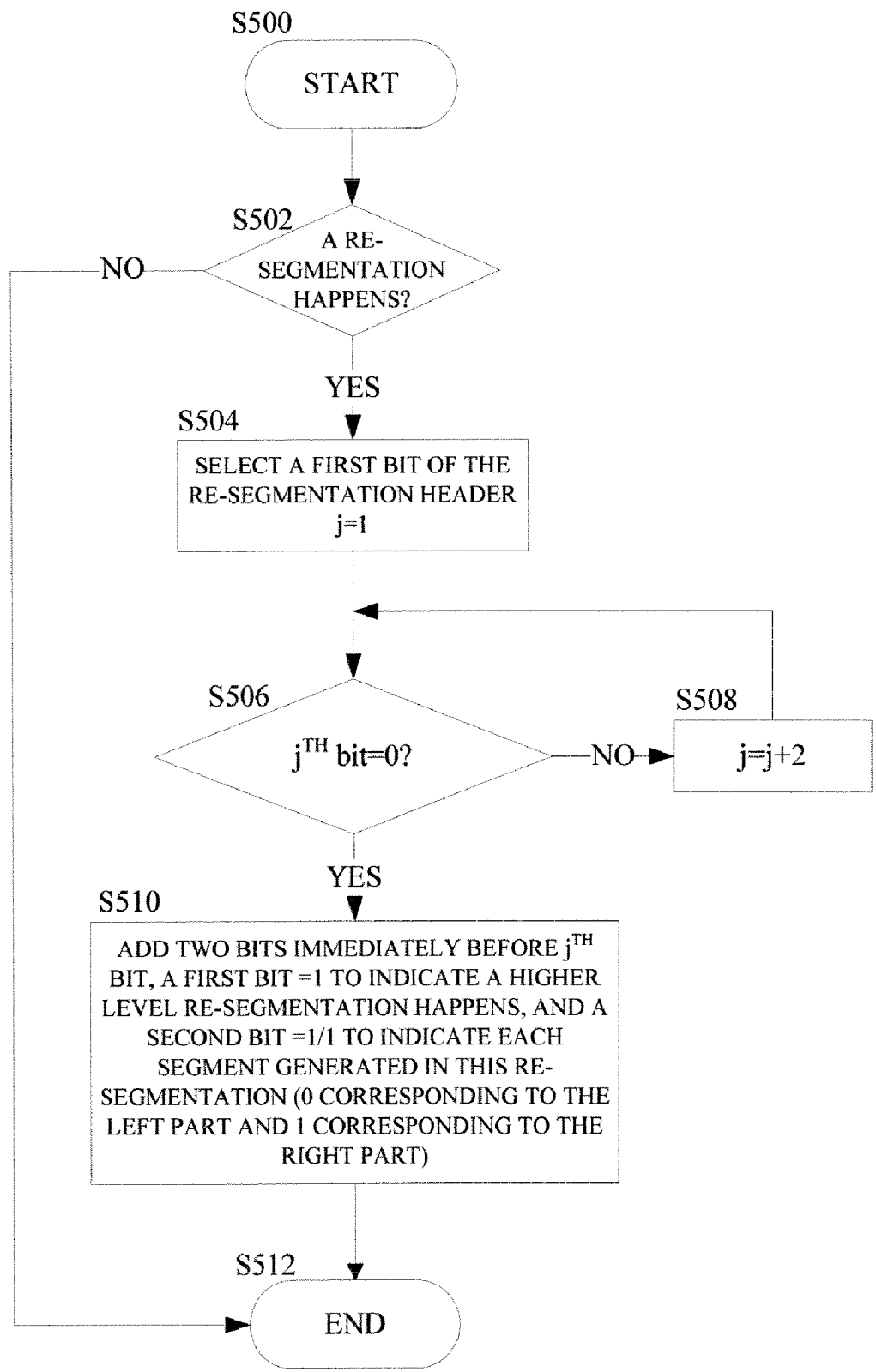
FIG. 5 is a flowchart showing a method of adding a segment index according to embodiments of the present invention.

FIG. 5 is a flowchart showing a method of adding a segment index according to embodiments of the present invention.

At step S500, the method of adding a segment index according to the present invention commences. Firstly, at step S502, it is determined whether a re-segmentation happens. If it is determined a re-segmentation happens ("Yes" in step S502), then the first bit in the re-segmentation header is selected at step S504. Here the bit pointer j is set as 1. Then at step S506, it is determined whether the $j^{th}$ bit (the first bit at this time) of the re-segmentation header is 0. If it is determined that the $j^{th}$ bit of the re-segmentation header is not 0 at step S506 ("No" in step S506), then at step S508, the $(j+2)^{th}$ bit (the third bit at this time) of the re-segmentation header is selected. Here the bit pointer j is set to j+2 as j=j+2. Then the method proceeds to step S506. If it is determined that the $j^{th}$ bit of the re-segmentation header is 0 at step S506 ("Yes" in step S506), then the method proceeds to step S510. The bit Endbit indicating the end of the re-segmentation header and the start of other information can be found by reiteration of steps S506 and S508. At step S510, two bits are added before the $j^{th}$ bit (i.e., the bit EndBit) of the re-segmentation header, including Li and L/Ri. The first bit Li is set as Li=1 to indicate a higher level re-segmentation happens. The second bit is set as L/Ri=0 or 1, to indicate each segment generated in this re-segmentation. As a non-limiting example, L/Ri=0 corresponds to the right part and L/Ri=1 corresponds to the left part, and vice versa. After the step S510 is completed, the method of adding a segment index according to the present invention goes to the end at step S512.

Furthermore, if it is determined that no re-segmentation happens at step S502 ("No" in step S502), then the method jumps to the end at step S512.

Figure 6:
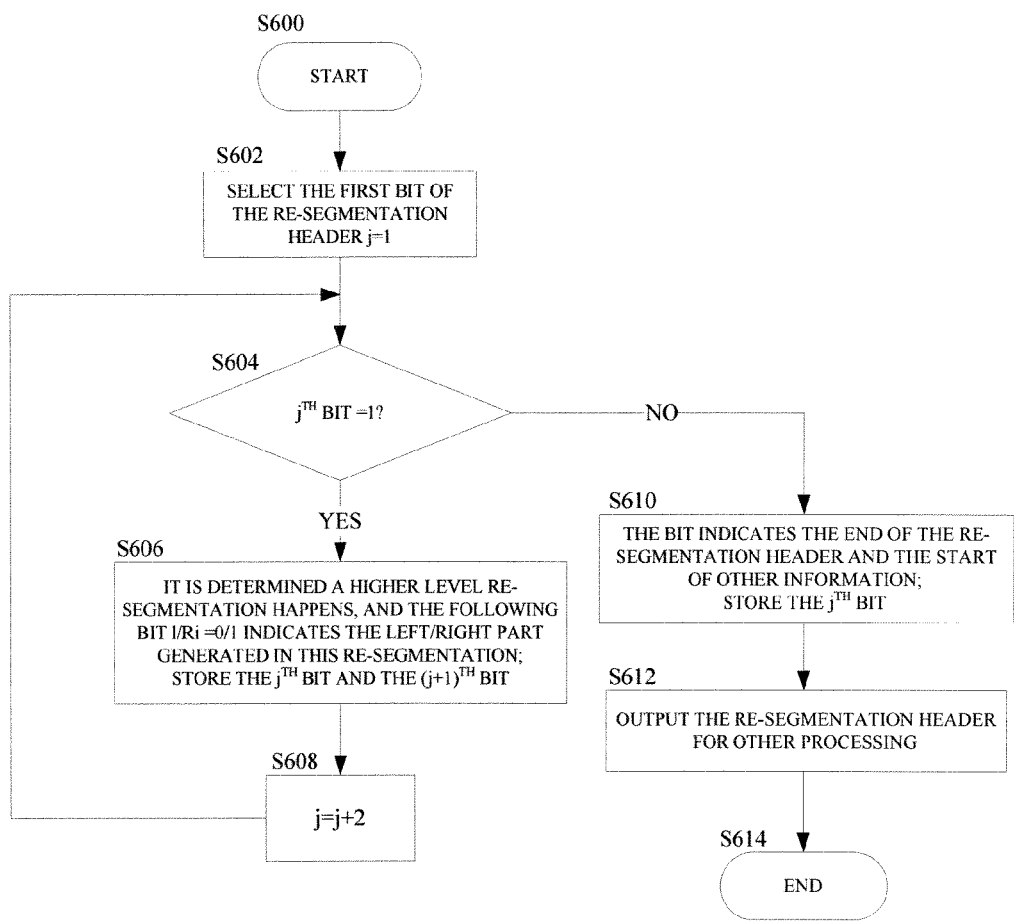
FIG. 6 is a flowchart showing a method of detecting a segment index according to embodiments of the present invention.

FIG. 6 is a flowchart showing a method of detecting a segment index according to embodiments of the present invention.

At step S600, the method of detecting a segment index according to the present invention commences. Firstly, at step S602, the first bit in the re-segmentation header is selected. Here the bit pointer j is set as 1. Then at step S604, it is determined whether the $j^{th}$ bit (the first bit at this time) of the re-segmentation header is 1. If it is determined that the $j^{th}$ bit of the re-segmentation header is 1 at step S604 ("Yes" in step S604), then it is determined that a higher level re-segmentation happens, and the following bit (L/Ri)=0/1 indicates that this segment is the left/right segment generated in the re-segmentation at step S606. The $j^{th}$ bit (the first bit at this time) and the $(j+1)^{th}$ bit (the second bit at this time) are stored. Then the method goes to step S608 to select the $(j+2)^{th}$ bit (i.e., the third bit) of the re-segmentation header. Here the bit pointer j is set to j+2 as j=j+2. Then the method proceeds to step S604.

If it is determined that the $j^{th}$ bit of the re-segmentation header is not 1 at step S604 ("No" in step S604), then the method proceeds to step S610. This bit indicates the end of the re-segmentation header and the start of other information. The j th bit is stored and the method proceeds to step S612. All the stored bits are outputted sequentially as a stored re-segmentation header. After the step S612 is completed, the method of detecting a segment index according to the present invention goes to the end at step S614.

Figure 7:
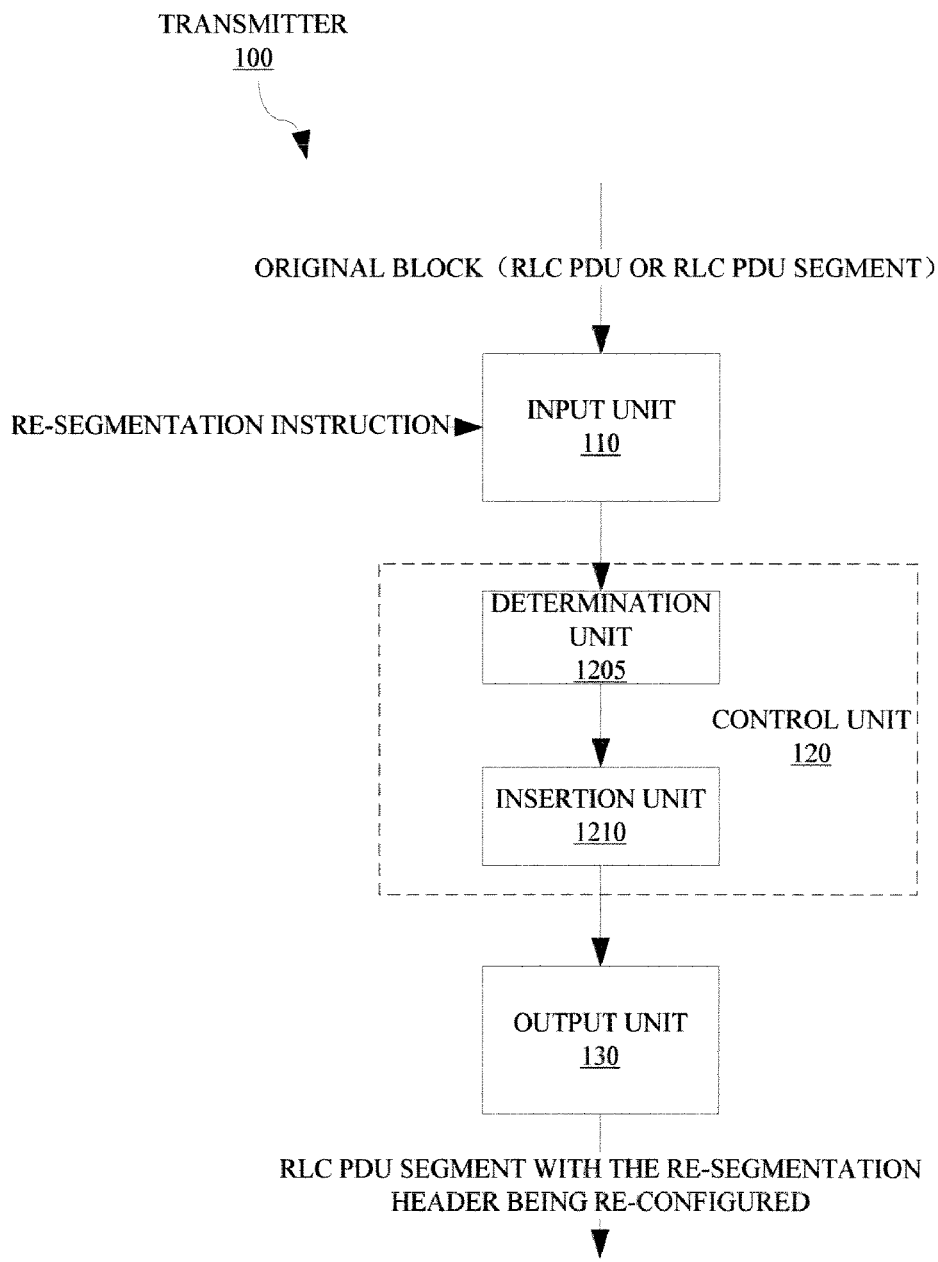
FIG. 7 is a block diagram showing an apparatus of adding a segment index according to embodiments of the present invention.

FIG. 7 is a block diagram showing an apparatus of adding a segment index according to embodiments of the present invention.

The apparatus of adding a segment index is located at the transmitter 100. The transmitter 100 is either a base station or a mobile station.

The apparatus of adding a segment index according to embodiments of the present invention comprises an input unit 110, a control unit 120 and an output unit 130. The control unit 120 comprises a determination unit 1205 and an insertion unit 1210.

The input unit 110 receives an original block (a RLC PDU or a RLC PDU segment) and a re-segmentation instruction from exterior. The determination unit 1205 determines whether a re-segmentation happens according to the information transmitted from the input unit.

The determination unit 1205 looks for a bit indicating the end of the re-segmentation header and the start of other information in the re-segmentation header of the current block if it is determined a re-segmentation happens, and instructs the insertion unit 1210 to insert two bits (i.e., Li and L/Ri) immediately before the bit indicating the end of the re-segmentation header and the start of other information, a first bit (Li)=1 indicating a higher level re-segmentation happens, and a second bit (L/Ri)=0 or 1 indicating each part generated in this re-segmentation (0 corresponding to the left part an 1 corresponding to the right part, as a non-limiting example). The output unit 130 finally outputs a RLC PDU with a re-segmentation header re-set by the insertion unit 120.

Figure 8:
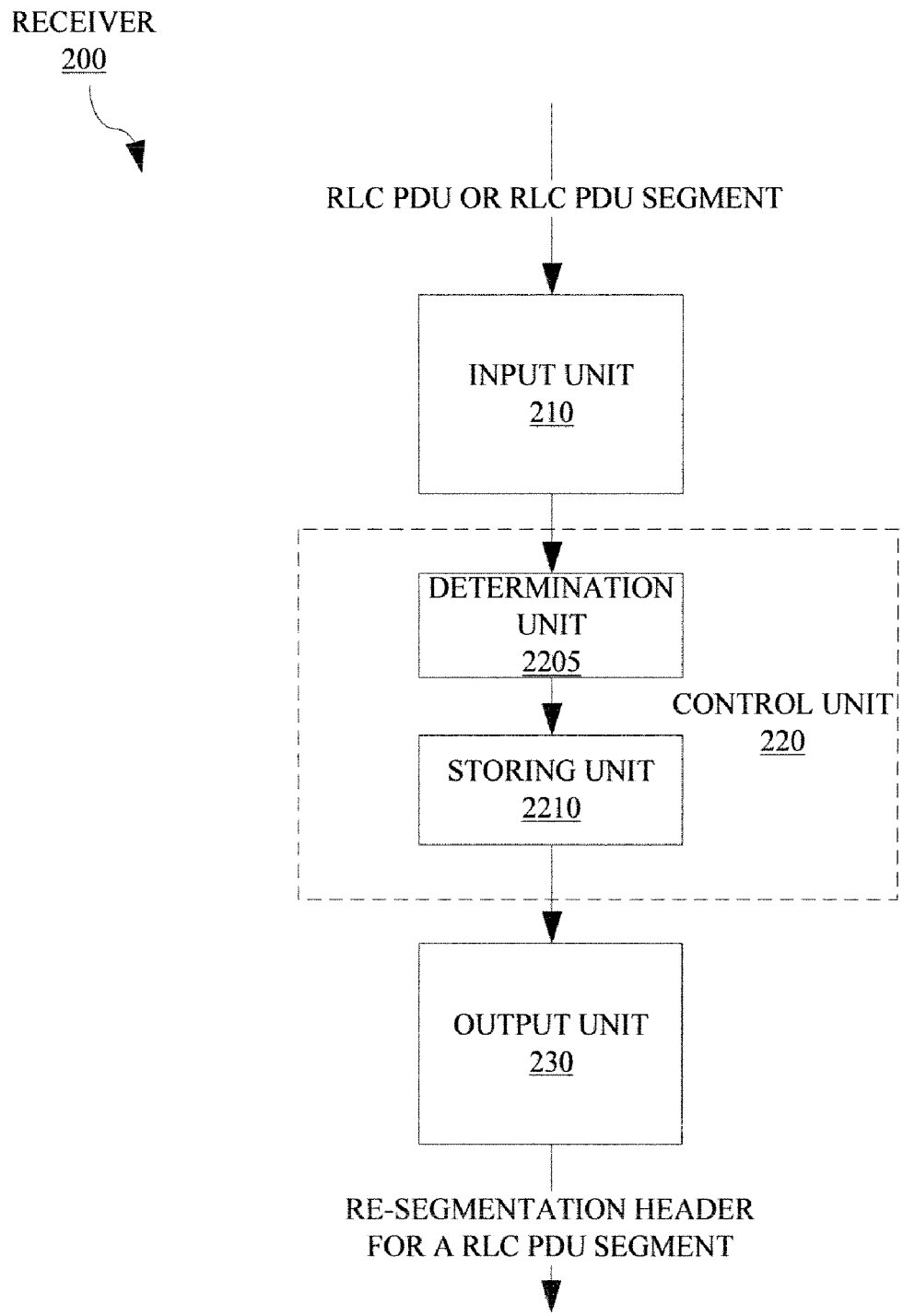
FIG. 8 is a block diagram showing an apparatus of detecting a segment index according to embodiments of the present invention.

FIG. 8 is a block diagram showing an apparatus of detecting a segment index according to embodiments of the present invention.

The apparatus of detecting a segment index is located at the receiver 200. The receiver 200 is either a base station or a mobile station.

The apparatus of detecting a segment index according to embodiments of the present invention comprises an input unit 210, a control unit 220 and an output unit 230. The control unit 220 comprises a determination unit 2205 and a storing unit 2210.

The input unit 210 receives an original block (a RLC PDU or a RLC PDU segment). The determination unit 2205 determines a bit indicating the end of the re-segmentation header and the start of other information in the re-segmentation header of the current block, according to information transmitted from the input unit 210. The storing unit 2210 stores a re-segmentation header from the first bit of the re-segmentation header to the bit indicating the end of the re-segmentation header and the start of other information determined by the determination unit. The output unit 230 outputs the re-segmentation header for the RLC PDU or the RLC PDU segment stored by the storing unit 2210.

The foregoing description is only the preferred embodiment of the present invention. For those skilled in the art, any change, substitution or addition that can be made readily within the scope of the present invention should be encompassed by the scope of the present invention. Therefore, the present invention should not be limited to the preferred embodiments, whose protection should only be defined by the claims.

What is claimed is:

1. A method of adding a segment index for re- segmentation, comprising:
    determining, by a determining unit, whether a re-segmentation happens;
    looking, by the determining unit, in a re-segmentation header of a current block, for a bit indicating the end of the re-segmentation header and the start of other information if it is determined a re-segmentation happens; and
    inserting, by an inserting unit, two bits immediately before the bit indicating the end of the re-segmentation header and the start of other information, a first bit indicating a higher level re-segmentation has happened, and a second bit indicating one part generated in this re-segmentation.

2. The method of adding a segment index for re-segmentation according to claim 1, further comprising:
    outputting the block with the two bits having been inserted in the re-segmentation header.

3. The method of adding a segment index for re-segmentation according to claim 1, further comprising:

remaining the re-segmentation header unchanged when it is determined no re-segmentation happens.

4. The method of adding a segment index for re-segmentation according to claim 1, wherein the bit indicating the end of the re-segmentation header and the start of other information has a value opposite to the added first bit.

5. The method of adding a segment index for re-segmentation according to claim 4, wherein the bit indicating the end of the re-segmentation header and the start of other information indicates that no re-segmentation happens in a Protocol Data Unit (PDU) that is not segmented.

6. The method of adding a segment index for re-segmentation according to claim 4, wherein the bit indicating the end of the re-segmentation header and the start of other information is a Re-segmentation Indicator (RI) in a Protocol Data Unit (PDU) that is not segmented; and the first bit in the re-segmentation header is the RI in a PDU that is segmented.

7. The method of adding a segment index for re-segmentation according to claim 1, wherein the current block is re-segmented into two parts in each time of re-segmentation, and the first part is transmitted in the current Transmission Time Interval (TTI) and the second part is buffered for a next transmission chance.

8. The method of adding a segment index for re-segmentation according to claim 1, wherein the re-segmentation is a re-segmentation for a Radio Link Controller-Protocol Data Unit (RLC-PDU).

9. An apparatus for adding a segment index for re-segmentation, comprising:
an input unit for receiving an original block and a re-segmentation instruction from exterior;
a determination unit for determining whether a re-segmentation happens according to the information transmitted from the input unit, and looking for in the re-segmentation header of a current block a bit indicating the end of the re-segmentation header and the start of other information if it is determined a re-segmentation happens; and
an insertion unit for inserting two bits immediately before the bit indicating the end of the re-segmentation header and the start of other information, a first bit indicating a higher level re-segmentation happens, and a second bit indicating one part generated in this re-segmentation.

10. The apparatus for adding a segment index for re-segmentation according to claim 9, further comprising:
an output unit for outputting the block with the two bits having been inserted in the re-segmentation header.

11. The apparatus for adding a segment index for re-segmentation according to claim 9, wherein the determination unit determines to remain the re-segmentation header unchanged when it is determined no re-segmentation happens.

12. The apparatus for adding a segment index for re-segmentation according to claim 9, wherein the bit indicating the end of the re-segmentation header and the start of other information has a value opposite to the added first bit.

13. The apparatus for adding a segment index for re-segmentation according to claim 12, wherein the bit indicating the end of the re-segmentation header and the start of other information indicates that no re-segmentation happens in a Protocol Data Unit (PDU) that is not segmented.

14. The apparatus for adding a segment index for re-segmentation according to claim 12, wherein the bit indicating the end of the re-segmentation header and the start of other information is a Re-segmentation Indicator (RI) in a Protocol Data Unit (PDU) that is not segmented; and the first bit in the re-segmentation header is the RI in a PDU that is segmented.

15. The apparatus for adding a segment index for re-segmentation according to claim 9, wherein the original block is re-segmented into two parts in each time of re-segmentation, and the first part is transmitted in the current Transmission Time Interval (TTI) and the second part is buffered for a next transmission chance.

16. The apparatus for adding a segment index for re-segmentation according to claim 9, wherein the re-segmentation is a re-segmentation for a Radio Link Controller-Protocol Data Unit (RLC-PDU).

17. The apparatus according to claim 9 implemented in a base station.

18. The apparatus according to claim 9 implemented in a mobile station.

19. A method of detecting a segment index for re-segmentation, comprising:
determining in a re-segmentation header of a current block a bit indicating the end of the re-segmentation header and the start of other information; and
storing the re-segmentation header from the first bit of the re-segmentation header to the determined bit indicating the end of the re-segmentation header and the start of other information;
outputting the stored re-segmentation header;
wherein determining in a re-segmentation header of a current block a bit indicating the end of the re-segmentation header and the start of other information includes testing whether a current bit is the bit indicating the end of the re-segmentation header and the start of other information for every second bit beginning with the first bit of the re-segmentation header of the current block until the bit indicating the end of the re-segmentation header and the start of other information is identified;
storing the current bit and a following bit when the testing determines that the current bit is not the bit indicating the end of the re-segmentation header and the start of other information; and
storing the current bit and sequentially outputting all the stored bits as a stored re-segmentation header when the testing determines that the current bit is the bit indicating the end of the re-segmentation header and the start of other information.

20. The method of detecting a segment index for re-segmentation according to claim 19, wherein the re-segmentation is a re-segmentation for a Radio Link Controller-Protocol Data Unit (RLC-PDU).

21. A method of detecting a segment index for re-segmentation, comprising:
determining in a re-segmentation header of a current block a bit indicating the end of the re-segmentation header and the start of other information; and
storing the re-segmentation header from the first bit of the re-segmentation header to the determined bit indicating the end of the re-segmentation header and the start of other information, wherein the bit indicating the end of the re-segmentation header and the start of other information has a value opposite to a bit indicating whether a re-segmentation happens.

22. The method of detecting a segment index for re-segmentation according to claim 21, wherein the bit indicating the end of the re-segmentation header and the start of other information indicates that no re-segmentation happens in a Protocol Data Unit (PDU) that is not segmented.

23. The method of detecting a segment index for re-segmentation according to claim 21, wherein the bit indicating the end of the re-segmentation header and the start of other information is a Re-segmentation Indicator (RI) in a Protocol Data Unit (PDU) that is not segmented; and the first bit in the re-segmentation header is the RI in a PDU that is segmented.

24. An apparatus for detecting a segment index for re-segmentation, comprising:
  an input unit for receiving an original block;
  a determination unit for determining in a re-segmentation header of the current block a bit indicating the end of the re-segmentation header and the start of other information, according to information transmitted from the input unit; and
  a storing unit for storing the re-segmentation header from the first bit of the re-segmentation header to the determined bit indicating the end of the re-segmentation header and the start of other information
  an output unit for outputting the stored re-segmentation header, wherein
  the determination unit test whether a current bit is the bit indicating the end of the re-segmentation header and the start of other information for every second bit, beginning with the first bit of the re-segmentation header of the current block, until the bit indicating the end of the re-segmentation header and the start of other information is identified;
  the storing unit stores the current bit and a following bit when the determination unit determines that the current bit is not the bit indicating the end of the re-segmentation header and the start of other information; and
  the storing unit stores the current bit and the output unit sequentially outputs all the stored bits as a stored re-segmentation header when it is determined that the current bit is the bit indicating the end of the re-segmentation header and the start of other information.

25. The apparatus for detecting a segment index for re-segmentation according to claim 24, wherein the re-segmentation is a re-segmentation for a Radio Link Controller-Protocol Data Unit (RLC-PDU).

26. The apparatus according to claim 24 implemented in a base station.

27. The apparatus according to claim 24 implemented in a mobile station.

28. An apparatus for detecting a segment index for re-segmentation comprising:
  an input unit for receiving an original block;
  a determination unit for determining in a re-segmentation header of the current block a bit indicating the end of the re-segmentation header and the start of other information, according to information transmitted from the input unit; and
  a storing unit for storing the re-segmentation header from the first bit of the re-segmentation header to the determined bit indicating the end of the re-segmentation header and the start of other information, wherein the bit indicating the end of the re-segmentation header and the start of other information has a value opposite to a bit indicating whether a re-segmentation happens.

29. The apparatus for detecting a segment index for re-segmentation according to claim 28, wherein the bit indicating the end of the re-segmentation header and the start of other information indicates that no re-segmentation happens in a Protocol Data Unit (PDU) that is not segmented.

30. The apparatus for detecting a segment index for re-segmentation according to claim 28, wherein the bit indicating the end of the re-segmentation header and the start of other information is a Re-segmentation Indicator (RI) in a Protocol Data Unit (PDU) that is not segmented; and the first bit in the re-segmentation header is the RI in a PDU that is segmented.

* * * * *